(No Model.) 3 Sheets—Sheet 1.
C. W. WILLIAMS, G. S. BARNUM & E. B. IVES.
APPARATUS FOR MAINTAINING ELECTRICAL CONNECTIONS.
No. 307,888. Patented Nov. 11, 1884.
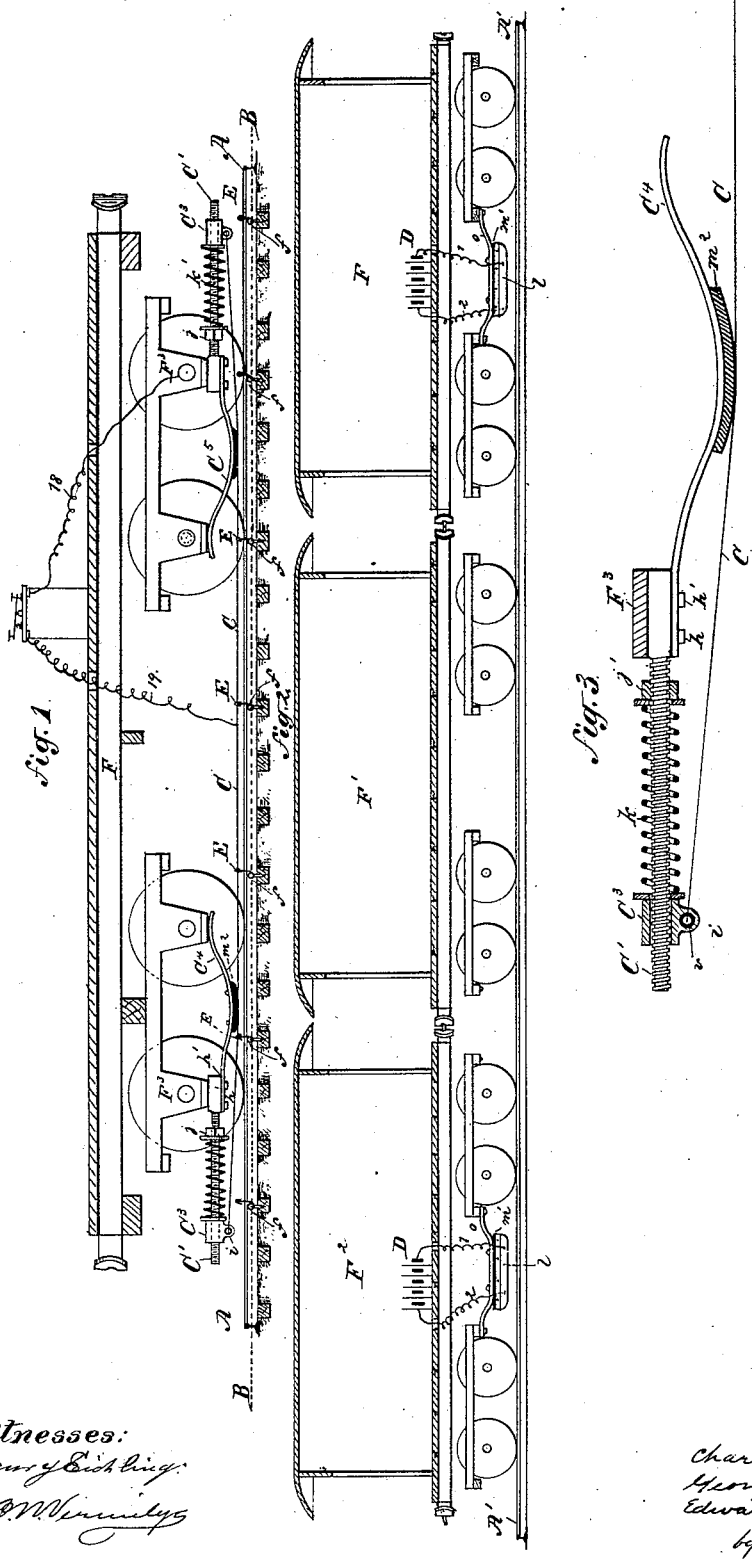

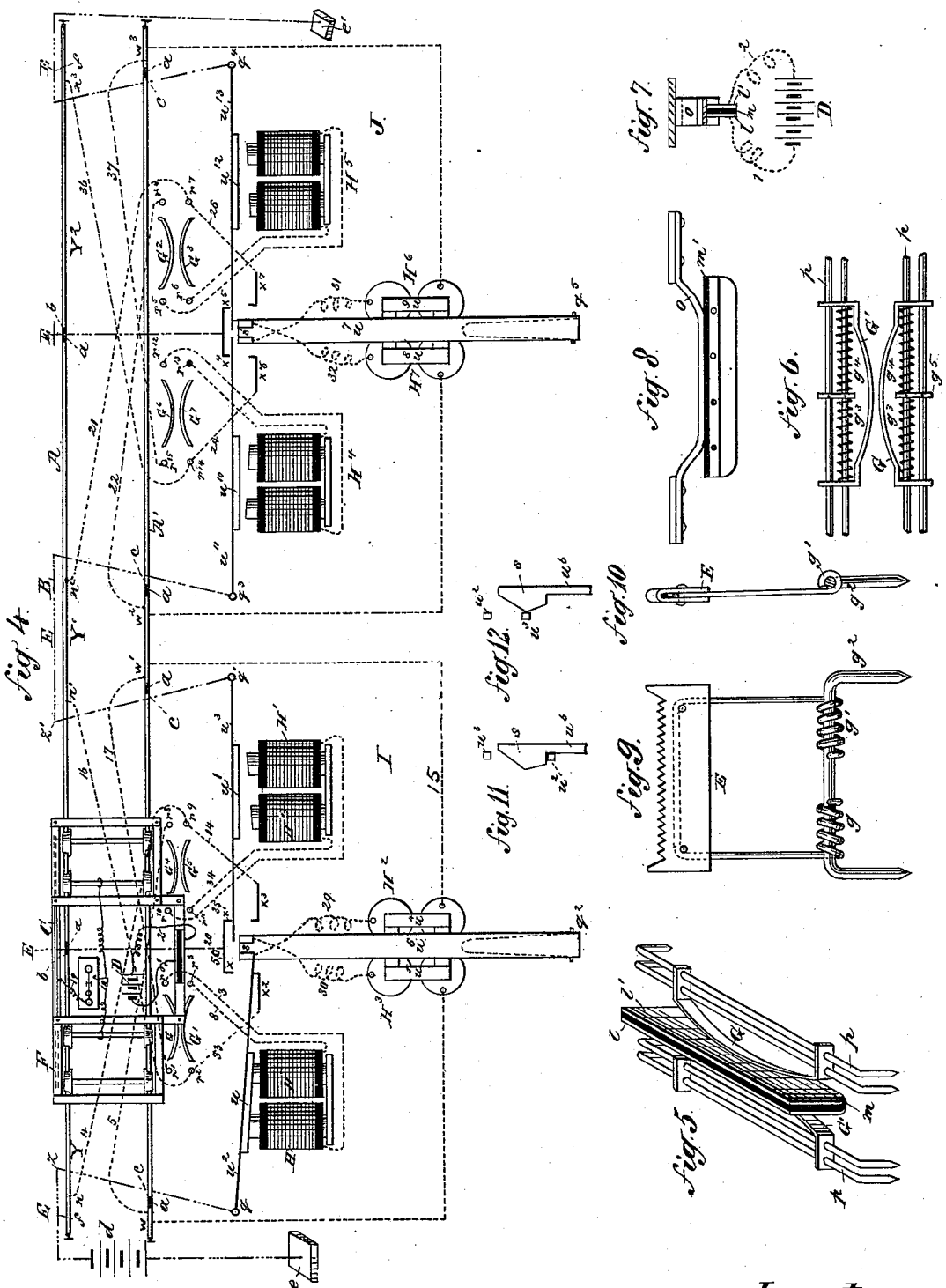

(No Model.) 3 Sheets—Sheet 3.
C. W. WILLIAMS, G. S. BARNUM & E. B. IVES.
APPARATUS FOR MAINTAINING ELECTRICAL CONNECTIONS.
No. 307,888. Patented Nov. 11, 1884.
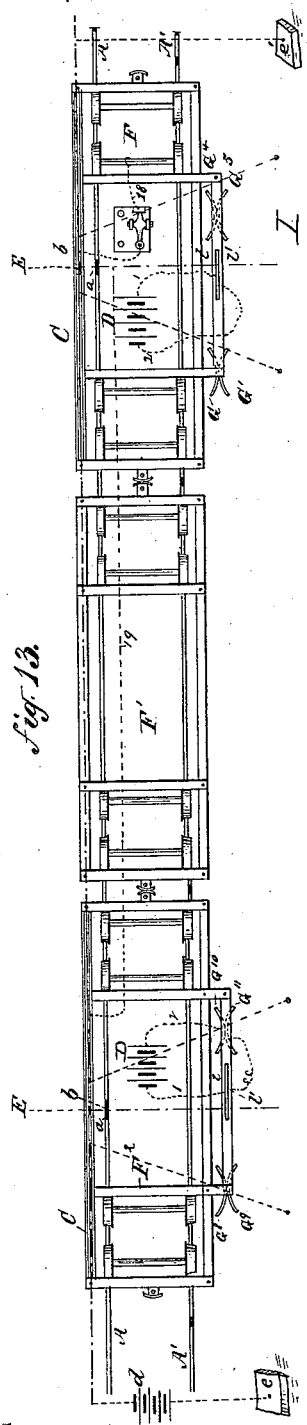
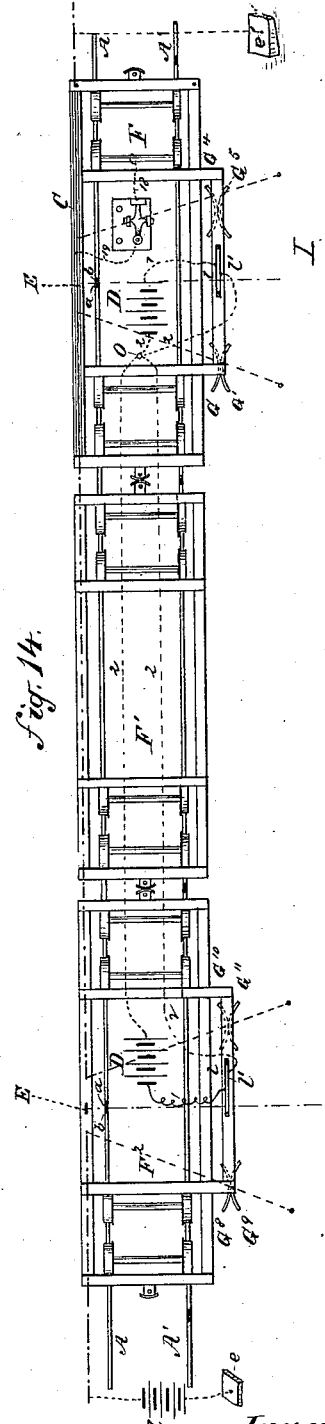

UNITED STATES PATENT OFFICE.

CHARLES W. WILLIAMS, OF CAVE CITY, KENTUCKY, GEORGE S. BARNUM, OF ATLANTA, GEORGIA, AND EDWARD B. IVES, OF NEW YORK, N. Y.

APPARATUS FOR MAINTAINING ELECTRICAL CONNECTIONS.

SPECIFICATION forming part of Letters Patent No. 307,888, dated November 11, 1884.

Application filed December 24, 1883. (No model.)

*To all whom it may concern:*

Be it known that we, CHARLES W. WILLIAMS, of Cave City, Barren county, Kentucky, GEORGE S. BARNUM, of Atlanta, in the county of Fulton and State of Georgia, and EDWARD B. IVES, of the city of New York, in the county and State of New York, have jointly invented a new and useful improvement in apparatus for maintaining electrical connection between a stationary electrical instrument and an electrical instrument on a car moving on the metal rails of a railway, of which the following is a specification.

The object of our invention is to establish continuous electrical connection between an electro-telegraphic instrument on a car moving on a railroad and local telegraph-stations, so that telegraphic communications may be transmitted between such car and stations. Our general plan is to run a wire conductor along by the side of the railroad in near proximity to the outside of one of the rails, the wire being connected to the main battery on the line and properly grounded at its termini; to divide the rails into insulated sections, and at suitable intervals along the line to locate on the road-bed current-shifters or key-blocks, whereby the current is shifted or switched from the conducting-wire onto one of the rails of the section upon which the car at the time is entering, the said section being used as the conductor at that point, and the current from the rail being led through a telegraphic instrument in the car and back to the main-line conductor, so that the current will thus pass through the car while it is traversing the said section, the operation being repeated on each of the sections of the rail, a similar current-shifter being located at each insulated point of section of the rail used as a part of the main circuit. In this plan the apparatus of the said key or switch blocks is actuated by one or more batteries located on the train, which operate to shift the current at the several key-blocks in succession as the train passes over the road.

We will now proceed to describe the apparatus embodying our invention, having reference to the accompanying drawings, in which—

Figure 1 is a side elevation of one side of a car (the body being shown in section) carrying a telegraphic instrument and the devices employed to make connection between the same and contact-plates on the main-line conductor, showing also said main-line conductor (in dotted lines) with its contact-plates and the rail used as a part of the main circuit. Fig. 2 is also a side elevation of the opposite sides of three cars, (their bodies being also shown in section,) showing thereon the batteries and the shoes or plates which, by passing through the key or switch blocks, shift the main current, together with the other rail of the road. Fig. 3 is an enlarged view, partly in section, of the device used to make contact between the wire from the telegraphic instrument and the contact-plates on the main conductor. Fig. 4 is a plan view of the rails of the road, showing their sections, two key or switch blocks, and a car the shoe upon which has just opened the left-hand block; and Figs. 5 to 12, inclusive, are detail views of parts of the several devices hereinafter described. Fig. 13 is a plan view of three cars, showing the relative positions of the wires C and plates $l$ $l'$ on the front and rear ends of the train with reference to each other and the relative positions of the springs G G' G³ G⁴, &c., and the insulated points of section of the rails; and Fig. 14 is a plan view of the arrangement of said wires, plates, springs, and insulated points of section when by the use of a switch one set of wires C is dispensed with.

A A' represent the rails of the road divided into sections, the several sections being insulated one from another by some suitable insulating material, $a$, interposed between the ends of the rails at their several points of section, as at $b$ $c$.

B represents the main-line-wire conductor, with a main battery at $d$, Fig. 4, grounded at $e$ $e'$. Along this wire at suitable intervals, as at $f$, contact-plates E, to be hereinafter more particularly described, are placed, the said plates being so connected with the line-wire that the current passes through them.

F represents a car on the track, into and through which the current is to be continuously passed from the rail to the main-line conductor as the car passes over the road.

The contact-plates E, before referred to, consist of a bar or plate of metal (shown in Figs. 9 and 10) mounted upon a spring consisting, preferably, of a wire wound in two coils, $g$ $g'$, at its ends. These said coils are placed upon a staple, $g^2$, which may be driven into a suitable insulating bed-piece, usually attached to one of the railway-ties. The wire is then bent into a loop and the looped portion attached to the bar or plate E, so that it will stand in near proximity and at right angles to the side of the rail and have a yielding vertical motion, the conducting-wire being so connected thereto that the current will pass through the plate.

To insure contact between the plate E and the device on the car, about to be described, we preferably corrugate the upper surface of said plate, as shown in Fig. 9.

The device for establishing a continuous metallic connection between the contact-plates E in the main conductor and the instrument on the car consists of a metal wire, preferably a number of iron or steel wires arranged horizontally parallel to each other, and so attached to the car that they will slide along in contact with said plates E as the car moves over the track. In Figs. 1 and 3 these wire connections are represented at C. They extend preferably from one truck-frame to the other, and are stretched taut and in range with said plates E, so as to make contact with them.

The devices for supporting and stretching these wires consist of strong bars C', one on each truck-frame, to which they are firmly bolted by bolts $h$ $h'$. Arranged to slide on each bar is a collar, $C^3$, on the lower side of which is a lug, $i$, in an opening in which is a thimble, $v$, of some insulating material, the said wires C being secured to and at the same time insulated from said lugs. $j$ $j'$ are nuts working on screw-threads cut on the said bars, and between the said nuts and collars are spiral springs $k$ $k'$. By running out the nuts upon the screw-threads the springs will, as is obvious, be forced against the collars and the collars pushed toward the outer ends of the bars, thus giving tension to the wires. The semi-elliptic springs $C^4$ $C^5$—one bolted to each of the car-trucks $F^3$—provide an elastic bridge near each end of the wires C, between which they are stretched and carried down to the level of the contact-plates E. Insulating material $m^2$ is interposed between said springs and wires. These contact-wires are thus carried by the car, insulated from it. The contact-plates E are placed at such intervals on the line-wire that said contact-wires C will always rest upon one or more of said plates E.

The key or switch blocks located, as before stated, one near the extremity of each section of the rail used as a part of the main-line circuit, are represented in Fig. 4.

The object of the device, as already indicated, is to break the main circuit at the point where the block is located, and to connect one of the ends so broken with the rail of the section of the road upon which the train is entering, leaving the other end in connection with the contact-plates at and before that point. This operation is effected by means of electro-magnets on the ground actuated by a battery on the train, there being preferably provided one battery at the forward end of the train to actuate the key-block to break the circuit and shift the current into the rail when going forward, and another independent battery at the rear end of the train to close the main circuit at the preceding key-block, and thus shift the current back into the main-line conductor at the latter point. When running backward, the offices of the batteries are reversed, but as the two sets of plates $l$ $l'$, by means of which the connection is effected between the batteries and the switch-blocks are not both in use at the same time, one battery properly connected to both of said sets of plates would perform the entire service; in fact, in running forward the rear set of plates alone is necessary, and vice versa; but in order to provide for running both ways we employ two sets, a set being needed at the end of the train last passing the switch, in whichever direction the train is moving, each being so placed on the car as to make the connections necessary to actuate the magnets to break the circuit at the block it is passing after the last pair of wheels of the train pass the insulated point of section of rail A', and to close the circuit at the preceding block before said last pair of wheels has passed the insulated point of section in the rail A, for the purposes hereinafter set forth.

To obtain a connection between the battery on the train and the electro-magnets on the ground or roadway, the apparatus we use consists of the following devices: For the circuit of each battery, and at each end of the train, a circuit-closer (shown in detail in Figs. 7 and 8) consisting of two plates, $l$ $l'$, laid together flatwise, with insulating material $m$ interposed between them, is provided, and said plates are severally connected with the poles of the battery D by wire-connections 1 and 2. These plates are carried by or suspended from the truck-frames of the forward and rear cars, and located as near their respective ends of the train as convenient, in order that the sections of rail A' may be more easily proportioned, in the manner and for the purpose hereinafter described. They are attached, preferably, to the truck-frames by semi-elliptic springs $o$, bolted at their ends to the proper truck-frames, and carrying the plates suspended from their lower faces, and so located as to range a little outside of the rail of the road, and a little above the level of said rail, to avoid striking crossings, switches, &c., the springs $o$ being arranged to allow them a slight vertical but no lateral motion. These plates are insulated from the springs $o$ by insulating material $m'$, interposed between said plates and springs.

The switch-blocks referred to each comprises four electro-magnets, H H' H² H³, two of them being employed when the train moves in one direction—one of them to break and one of them to restore the circuit through the main-line-wire conductor—and the other two for similar purposes when the car moves in the opposite direction. If preferred, the same magnet may be used to restore the circuit, in whichever direction the train moves, by having the wire connections (shown in the drawings as attached to the magnets H² H³) all connected to one magnet occupying their position. These magnets H H' H² H³ are located upon a suitable bed or support upon the ground in proximity to the side of the rail. H and H' have armatures $u$ $u'$, each being mounted upon swinging arms or levers $u^2$ $u^3$, that are respectively pivoted in suitable supports at $q$ $q'$. The armatures $u^4$ $u^5$ of the magnets H² H³ are both mounted on the same swinging arm or lever $u^6$, which is pivoted at $q^2$ and normally held with its attached armatures away from magnets H² H³ by a spring (indicated by dotted lines) at said point of pivot. These magnets are so placed that the lever $u^6$, when swinging on its pivot, moves in a plane perpendicular with the plane of movement of the levers $u^2$ $u^3$, and can engage with the inner ends of either or both of said levers. The lever $u^6$ has at its inner end two catches, $s$, which engage with the inner ends of said levers $u^2$ $u^3$, respectively, when the armatures of the magnets H H' are drawn toward the said magnets. The arm $u^6$ being common to the two unlatching-magnets H² H³, if either or both are charged, their respective armatures will be attracted, and, moving toward the magnets, would (when placed as shown) lower the inner end of the lever $u^6$ and release the arms $u^2$ or $u^3$, either or both, from engagement therewith. The latches on this lever $u^6$ are so shaped, as shown in Figs. 11 and 12, that if one of the levers in the line—say $u^3$—is drawn down, it will press back said lever $u^6$, as represented in Fig. 12, and release the lever $u^2$ from its catch. The effect of this arrangement is to render it impossible for both $u^2$ and $u^3$ to be latched at the same time, unless H and H' be simultaneously charged, which in this system does not occur. The main circuit through the key-block is from the main-line wire, (indicated in Fig. 4 by the broken line composed of dashes and intermediate dots,) the levers $u^2$ $u^3$, posts $x$ $x'$, against which posts the inner ends of the levers $u^2$ $u^3$, respectively, rest when in their normal position, having metallic contact therewith, and wire 50; and it is evident that the said circuit will be broken whenever either of the said levers (and we will here say the lever $u^2$, as shown in Fig. 4, block I) is with its armature drawn toward the magnet and out of contact with its respective post; but when this occurs there is at the same time a connection established between the said lever $u^2$ and the rail A at $n'$, and the current passes thence through the car and back to the main-line conductor, as hereinafter described, and will so continue until the said lever $u^2$ returns to its normal position in contact with the post $x$. The connection between the lever $u^2$ and the rail A at $n'$ is made by means of the post $x^2$ and wires 33 and 16, the lever $u^2$, when drawn toward the magnet H, being brought in contact with said post $x^2$, as shown in Fig. 4. At the same time that said lever is thus drawn into contact with the post $x^2$ it will be locked in position by the catch on the end of the lever $u^6$, and will so remain until the catch is disengaged therefrom by the action of magnet H² or H³ upon its armature and attendant lever $u^6$, or the action of the lever $u^3$ upon the inner end of said lever $u^6$, as hereinbefore described. The course of the current through the main-line conductor, the rail, the car, and back to said conductor beyond the block, when connection is broken at post $x$ and closed at $x^2$, is as follows: from the main-line wire through lever $u^2$, to post $x^2$, thence by wires 33 and 16 to rail A at $n'$, from the rail to the wheel and axle of the car, thence by wire 18 to the instrument in the car, through this and wire 19 to wires C, and thence to the contact-plates E located at the insulated point of section $b$ of rail A, through wires 20 and 50, the post $x'$, lever $u^3$, and so on the main-line wire again, it being observed that the contact-plates E placed at the insulated points of section of the rail A, as at $b$, have no connection with the main-line conductor, except through wires 20 and 50, and corresponding wires running from the plates similarly located to posts occupying positions in each block similar to $x$ $x'$, but that said main-line conductor is at each block connected to the outer ends of swinging levers corresponding to levers $u^2$ $u^3$ in block I. After passing the point $z'$ on wire B the wires C of course make contact with the plates E, directly on said wire B, without passing the current first through wires 20 and 50, post $x'$, and lever $u^3$.

Upon the cross-ties, and in the vicinity of every key or switch block, preferably in the position shown at G G' G⁴ G⁵ in block I, Fig. 4, are placed two of the devices, (shown in detail in Figs. 5 and 6,) which consist of two semi-elliptical springs, G G', placed side by side, with their convex faces toward each other, as shown in said figures. They are held in place by any suitable means which will permit them to have a slight horizontal movement parallel to the rails of the road, the arrangement shown in said figures consisting of rods $p$, passing through holes in the ends of the springs G G', said ends being turned at right angles to the rods, as shown, and the rods being fastened at their ends in the cross-ties. Said springs should not have contact with the rails, and should be sufficiently near each other to be both touched by the plates $l$ $l'$, respectively, when said plates are passed between them, and the two pairs should be far enough apart to allow the plates $l\ l'$ to have left one pair before making contact with the next. At each end of these springs, but not in contact with the rods $p$, are placed contact studs or posts $r\ r'\ r^2\ r^3\ r^8\ r^9\ r^{10}\ r^{11}$, respectively, that are made fast in their positions. Wire-connection is established between $r$ and $r^3$, through the electro-magnet H, by means of the wires 3 and 8, and between posts $r^8$ and $r^9$ and rail A at $n$, and A' at $w$, respectively, by means of wires 4 and 5. $r^{10}$ and $r^{11}$ are connected to the magnet H' by wires 34 and 35, and $r'$ and $r^2$ are connected to section Y' of rail A at $n$, and rail A' at $w'$, respectively, by wires 16 and 17. The circuit-shifter, composed of the plates $l\ l'$, heretofore described, is so connected to the truck-frame and held in position thereon that it will pass between the said springs G G', and in contact with them and the succeeding pairs when the car passes by them, the friction between the springs and the plates being sufficient to force the springs along on the rods $p$ in the direction the train is going—say from left to right—into contact with the studs $r\ r^3$. Now, at the instant that this occurs the battery-circuit through the magnet H is closed, whereby the said magnet is charged and its armature $u$ attracted, drawing the lever $u^2$ out of contact with the post $x$, and the main current is thereby shifted from the main-line conductor to the rail, as before described, the battery-circuit being then from one pole of the battery on the train through wire 1, the plate $l$, spring G, stud $r$, wire 3, magnet H, wire 8, stud $r^3$, spring G', plate $l'$, and wire 2 to the other pole of the battery D on the train. The main-line circuit through rail A, section Y', continues, as has been described, until the lever $u^2$ is unlocked and allowed to resume its normal position in contact with post $x$. The unlocking of said lever is accomplished as follows: When the rear car of the train has reached the next succeeding switch-block J, the circuit shifter and closer thereon, passing between the springs $G^6\ G^7$ and leaving them, immediately slides between the springs $G^2\ G^3$, pressing them against the studs $r^4$ and $r^7$, and completing the circuit of the battery on the car, which is then as follows: From one pole of the battery, through wire 1, plate $l$, to spring $G^2$, contact-stud $r^4$, through wire 22 to rail A' at $w^2$, to $w'$, through wire 15, magnet $H^2$, wire 29, and lever $u^2$ to post $x^2$, thence by wires 33 and 16 to rail A at $n'$, to $n^2$, thence by wire 21 to the stud $r^7$, spring $G^3$, plate $l'$, and wire 2 to the other pole of the battery, whereby the magnet $H^2$ is charged, and its armature being attracted draws down the inner end of the lever $u^6$, and unlocks the lever $u^2$, which returns to its normal position in contact with post $x$, thereby re-establishing the normal main-line circuit through switch-block I. It will of course be seen that there must be no connection from rail A to rail A' on the section at the end of which is the switch to be closed by the shifter on a train going either way, through the wheels and axles of the cars, at the instant that the plates $l\ l'$ pass between springs $G^2\ G^3$, (if block I is to be closed,) so that the current may be compelled to follow the course just indicated. To insure this, the insulated point of section in rail A' must be so located that the last pair of wheels of the train shall have passed the insulated point of section before the said plates $l\ l'$ on the rear car make contact with said springs $G^2\ G^3$, or the plates on the other end of the train make contact with springs $G^6\ G^7$, if the train is passing from right to left. For this purpose we make insulated points of section on both sides of the various blocks, as at $c$, at a sufficient distance from the farther pair of springs in the nearest adjacent block as will permit the train to have passed over it before the current-shifter reaches said farther pair of springs. As the section of the main-line conductor immediately preceding the block I is entirely out of circuit after the circuit is broken at that block by the movement of lever $u^2$ from post $x$ to post $x^2$, and before the current at the preceding block is shifted from the rail back to the said section of the main-line conductor, it is necessary, in order to prevent a momentary cessation of the current from one end of the line to the other through the instrument on the car, that the wires C should have reached the plate E opposite the center of block I, before the plates $l\ l'$ pass between the springs G G', completing the battery-circuit, by means of which magnet H is charged and said lever $u^2$ moved, and to accomplish this we locate said wires C and plates $l\ l'$ in such relative positions on the train that such connection between C and E is made an instant before said plates $l\ l'$ reach said springs G G'; and as until the plates $l\ l'$ have reached the springs $G^4\ G^5$ the circuit is still open at the preceding block, and no current can pass into section Y' of rail A, and thence to the instrument on the car, said springs and plates should be so placed with reference to the distance from the plates to the last pair of wheels of the car, and that from the end of the section to the second set of springs (here $G^4\ G^5$) that the last wheels of the car will not have left section Y of rail A until said plates have made connection with the second set of springs, thereby closing the preceding block and permitting the current to resume its normal circuit at that point and to pass from the main-line wire through the various connections to section Y' of rail A, and thence to the instrument on the car. In backing, the same rule applies, although it would be with regard to the plates at the rear of the train and wires C, and therefore to then prevent a break there would need be a second set of wires C, arranged relatively to the last-named plates, as shown in Fig. 13. The same result may however be secured by having one set of wires C, as shown in Fig. 14, extend in a line parallel to one set of said plates, and beyond them the required distance in either direction, and then by an ordinary switch, O, under the control of the operator, cutting off the plates at the opposite end of the train from the battery when running the train in a direction that would pass those plates first through the springs. Of course, if the train consists of but one car, only one set of wires C and plates $l\ l'$ would be necessary. We also preferably provide electrical connection between wire 18 and more than one axle of the train, that there may be no break at the instant either of them passes over the insulating material separating one portion of rail A from the adjacent one. Special devices for this purpose are usually unnecessary, for ordinarily there is electrical connection between all the axles of a train through the metal employed in the construction of the cars.

Now, let it be supposed that the train, instead of going onto block J, had stopped and run back past block I. The plates $l\ l'$ at the rear of the train (or those at the front, if the others are switched off) will pass through springs $G^4\ G^5$, putting them in contact with posts $r^{10}\ r^{11}$. The current from the battery then goes by wire 1, plate $l$, spring $G^4$, post $r^{10}$, wire 35, through magnet H', wire 34 to post $r^{11}$, spring $G^5$, plate $l'$, wire 2, and the other pole of the battery. The effect of this is to charge the magnet H', thereby drawing to it armature $u'$, swinging lever $u^3$ on its pivot $q'$ and latching it. At the same time the inner end of the arm $u^3$, pressing back the inner end of $u^6$, releases $u^2$, as has been described. $u^2$ returns to its normal position in contact with post $x$, and restores the main circuit at that point, which will then be from the main-line wire to lever $u^3$, thence to post $x$, wires 50 and 20, contact-plate E at $b$, to contact-wires C, wire 19, through the instrument on the car, wire 18, the axle and wheel of the car, rail A, section Y, wire 4, from $n$, wire 14, post $x^3$, lever $u^3$, and the main-line conductor at $q'$. The next key or switch block will be set in corresponding manner, if to the right by the left-hand magnet and lever, and vice versa, and they are unlocked and restored to their normal position, as described, but one magnet being needed to lock and one to unlock the switches when the train moves in one direction. It is thus seen that the current will always be automatically shunted, so that its only circuit is through the car, whichever way the train is moving. It is preferable to place the wires C on one side of the train and the plates $l\ l'$ on the other, and when this is done the plates E and the springs G G' must be upon corresponding opposite sides of the track, when care must be taken that the wire-connections at the key-blocks should pass under and be insulated from the rails. Springs $g^3\ g^4$ may be placed on the rods $p$, and secured thereto, preferably at the center, or with their inner ends resting against a collar, $g^5$, secured to said rods $p$ at the center to hold the springs G G', &c., as nearly as may be, in one position on said rods $p$ when they are not in contact with plates $l\ l'$, and to return them to said position after such contact.

What we claim, and desire to secure by Letters Patent, is—

1. In a railroad-telegraph, the combination, with the iron rails of the road that are divided into insulated sections, as described, of a main-line-wire conductor located along by the side and in the vicinity of one of the rails, and of the described current-shifter or switch-block, consisting of an electro-magnet and a pivoted lever in the said main line, and connected to the armature of the magnet aforesaid, so as to be actuated thereby, and the described wire-connection between said lever and one of the iron rails of the road, whereby when the said lever is drawn toward the magnet the current is broken through the main-line conductor and shifted into the said rail, as and for the purpose described.

2. In a railroad-telegraph, the combination, with the main-line-wire conductor ranged along by the side of one of the rails, and in its near vicinity, of a series of contact-plates, E, in the said line, the described current-shifter or switch-block, whereby the current may be shifted, as described, into one of the rails, the wires C on the railway-car adapted to make contact with the said contact-plates, as described, and the described wire-connections between the parts, whereby when the current is shifted from the said line-wire conductor to the rail it will pass from the rail through the car and a telegraph-instrument thereon, and back to the main-line-wire conductor through the wires C and the said contact-plates E, all as described, and for the purpose specified.

3. The combination of the semi-elliptical springs G G', the contact-posts $r'\ r^3$, and the described wire-connections, the magnet H, the battery D on a car, the insulated plates $l\ l'$, attached to the car, as described, and wire-connections 1 and 2 between the poles of said battery and said plates, whereby the circuit of the said battery, when the said plates $l\ l'$ pass between and in contact with said semi-elliptical springs G G', and thereby force them into contact with the studs $r'\ r^3$, is closed through the described plates, springs, posts, and wires, and the magnet is thereby charged, all as and for the purpose described.

4. In a railway-telegraph, the combination, with the described insulated sectional rails of the road, of the semi-elliptical springs $G^2\ G^3$, the contact-posts $r^4\ r^7$, the insulated plates $l\ l'$, carried on the rear car of a train passing through switch-block J from switch-block I, and the battery D, with its wire-connections 1 and 2, on the train, the described wire and rail, electrical connections between said contact-posts and the rails, the magnet H', and its armature $u^4$, attached to the catch-lever $u^6$ in switch-block I, whereby when the said springs are, by the passage between them of said plates, carried on the rear car of the train, forced into contact with said posts $r^4 r^7$, the circuit of the said battery is closed through the said connections, said rails, and the magnet $H^2$, the lever $u^2$ is thereby unlocked, and the main-line circuit, previously broken at $x$, is thereby reclosed, as and for the purpose specified.

5. In a railway-telegraph, the combination, with described insulated sectional rail of the road, of the semi-elliptical springs $G^4 G^5$, the contact-posts $r^{10} r^{11}$, the insulated plates $l\ l'$, with their wire-connections 1 and 2, and the battery D on a car, passing from switch-block J through switch-block I, when locked, as shown, post $x^3$, and the described wire-connection between said post and the rail, wires 34 and 35, magnet $H'$, with its armature $u'$, attached to the lever $u^3$, and the catch-lever $u^6$, all in switch-block I, whereby when the said springs are, by the passage between them of the plates $l\ l'$, carried as described, forced into contact with said posts $r^{10} r^{11}$, the circuit of said battery is closed through the said connections and the magnet $H'$, said magnet is charged, said lever $u^2$ is thereby unlocked, and the main-line circuit, previously broken at $x$, is thereby reclosed, while at the same time it is broken at $x'$ and shifted into section Y of rail A, and the lever $u^3$ is locked by the catch at the inner end of lever $u^6$.

CHAS. W. WILLIAMS.
GEORGE S. BARNUM.
EDWARD B. IVES.

Witnesses for Williams:
E. G. GLEINE,
CARL ROSS.

Witnesses for Barnum:
L. L. McCLOSKEY,
ALEX. B. RANDALL.

Witnesses for Ives:
W. T. WILLIAMS,
ROBT. K. GRIERSON.